United States Patent
Inoue et al.

(10) Patent No.: US 7,332,110 B2
(45) Date of Patent: Feb. 19, 2008

(54) METHOD AND DEVICE FOR PRODUCING OPTICAL PART

(75) Inventors: Kazuo Inoue, Tokyo (JP); Kiyohiro Saito, Tokyo (JP); Tadayoshi Uehara, Sagamihara (JP)

(73) Assignee: Hoya Corporation, Tokyo (JP)

( * ) Notice: Subject to any disclaimer, the term of this patent is extended or adjusted under 35 U.S.C. 154(b) by 353 days.

(21) Appl. No.: 11/005,208

(22) Filed: Dec. 6, 2004

(65) Prior Publication Data

US 2005/0212154 A1 Sep. 29, 2005

(30) Foreign Application Priority Data

Dec. 9, 2003 (JP) .............................. 2003-409939

(51) Int. Cl.
  *B29C 43/02* (2006.01)
(52) U.S. Cl. ...................... 264/1.32; 264/2.2; 425/408; 425/808
(58) Field of Classification Search ...................... None
  See application file for complete search history.

(56) References Cited

U.S. PATENT DOCUMENTS

| | | | |
|---|---|---|---|
| 4,208,365 A | | 6/1980 | LeFevre |
| 4,693,446 A | * | 9/1987 | Orlosky ..................... 249/53 R |
| 5,893,998 A | * | 4/1999 | Kelley et al. ................ 249/111 |
| 5,948,327 A | | 9/1999 | Saito et al. |
| 6,201,036 B1 | * | 3/2001 | Fedorov et al. ................ 522/96 |
| 6,730,244 B1 | * | 5/2004 | Lipscomb et al. .......... 264/1.38 |
| RE38,617 E | * | 10/2004 | Saito et al. .................... 264/2.2 |
| 7,147,454 B2 | * | 12/2006 | Wang ........................... 425/408 |
| 2003/0111747 A1 | * | 6/2003 | Chiu et al. ................. 264/1.32 |
| 2003/0111749 A1 | * | 6/2003 | Chiu et al. .................... 264/2.2 |
| 2004/0021238 A1 | * | 2/2004 | Reed et al. .................... 264/2.2 |

FOREIGN PATENT DOCUMENTS

JP 55-84634 6/1980

(Continued)

OTHER PUBLICATIONS

WO 99/24243, Improved Method of Making a Finished Multi-Coated and/or Laminated Eyeglass Lens, Pulbication Date: May 20, 1999.

*Primary Examiner*—Mary Lynn Theisen
(74) *Attorney, Agent, or Firm*—Rankin, Hill, Porter & Clark LLP

(57) ABSTRACT

An annular insert (4) is arranged in the optical component molding cavity of a mold to surround an outer periphery of raw material resin in a direction in which the resin is distributed in the cavity to limit the distribution of the raw material resin and define an outer profile of a lens (L). With this arrangement, it is only necessary to provide raw material resin only by a quantity equal to the volume of the region surrounded by the molding surfaces of upper and lower mold inserts (14, 24) and the inner peripheral edge of the annular insert (4) of the mold, so that the required volume of the raw material resin can be reduced. Since the pressure is preserved at the outer periphery of the distributed resin by the presence of the annular insert (4), the residual strain of the resin is minimized to prevent generation of sink mark, thereby providing excellent optical characteristics on the lens (L).

26 Claims, 11 Drawing Sheets

FOREIGN PATENT DOCUMENTS

| | | |
|---|---|---|
| JP | 58-224724 | 12/1983 |
| JP | 60-112408 | 6/1985 |
| JP | 61-092814 | 5/1986 |
| JP | 61-118209 | 6/1986 |
| JP | 64-042222 | 2/1989 |
| JP | 05-116155 | 5/1993 |
| JP | 08-086904 | 4/1996 |
| JP | 3260072 | 12/2001 |
| JP | 2002-114524 | 4/2002 |
| JP | 2003-048728 | 2/2003 |

* cited by examiner

METHOD AND DEVICE FOR PRODUCING OPTICAL PART

BACKGROUND OF THE INVENTION

1. Field of the Invention

The present invention relates to a method and a device for producing an optical component and also to an optical component. More particularly, the present invention relates to a method and a device for molding an optical component to be used as a lens for spectacles or an optical appliance by pressurizing and distributing a plasticized raw material resin contained in a mold cavity, and also to an optical component produced by the producing method and producing device.

2. Description of Related Art

Methods for molding a resin optical component typically by means of injection compression molding are known (refer to, for example, Document 1: Japanese Patent Publication No. 3260072, and Document 2: International Publication WO99/24243 Leaflet).

The injection compression molding method of Document 1 is designed so that a molten raw material resin is injected into and filled in a mold body having a pair of lens molding cavities, a runner communicating with the cavities and a sprue communicating with the runner to mold a lens by compression molding.

In the molding method of Document 2 raw material resin of a lens (preform) is heated and the plasticized raw material resin is molded as a lens by compression molding.

However, the known injection molding methods are accompanied by drawbacks. For example, raw material resin is also filled in the runner and the sprue in addition to the lens molding cavities (Document 1) and raw material resin can spill out from the mold (see FIGS. 6 and 8 of Document 2), so that raw material resin is required by a volume greater than the volume essentially necessary for the molded product, or the lens, to make the known methods uneconomic. Furthermore, when, for instance, a molded product is used as a spectacle lens, only the central portion of the molded product corresponding to the profile of the frame of the spectacles is used. In other words, the remaining peripheral portion of the molded product is left unused and hence raw material resin is wasted.

Additionally, with the molding method of Document 2, the compressed raw material resin spills out of the mold so that, while the compressive force of the mold is applied to at the central portion of the lens, the compressive force is escaped to the outside at a peripheral portion of the lens to consequently degrade the optical characteristics of the peripheral portion of the lens.

SUMMARY OF THE INVENTION

It is an object of the present invention to provide a method and a device for producing an optical component that can economize the rate of consumption of raw material resin and improve the optical characteristics of the molded product as well as an optical component produced by such a method and such a device.

In an aspect of the present invention, there is provided a method of producing an optical component including the steps of: providing a mold having an optical component molding cavity thereinside and a pressurizing unit for clamping the mold to pressurize a raw material resin in the optical component molding cavity, and applying pressure to the plasticized raw material resin and forcing it to stretch by the pressurizing unit, in which an annular elastic member is arranged in the optical component molding cavity so as to enclose the outer periphery of the raw material resin in a direction in which the resin is distributed to restrict the distribution of the resin and define an external profile of the optical component.

Thus, with the method of producing an optical component, it is only necessary to provide raw material resin by an amount equal to the volume of the space defined by the molding surfaces of the cavity and the inner peripheral surface of the elastic member because the distribution of raw material resin is restricted and the external profile of the optical component to be molded is defined by the elastic member, and accordingly, it is possible to economize the rate of consumption of raw material resin. When the molded product is used as a spectacle lens, the inner diameter of the elastic member may be defined in accordance with the actual size of the lens in order to further save raw material resin. Furthermore, since it is not necessary to provide different molds for molded products of different sizes, the production cost of the mold can be reduced.

Additionally, appropriate pressure can be applied (i.e. packed) to the peripheral portion of the molded product, by restricting the resin distribution toward the outside by the elastic member, i.e. by limiting the distribution of the raw material resin by the elastic member, thereby providing the molded product with improved optical characteristics. The elastic member is deformed to increase its inner diameter by the pressure of the distributed resin, which is restored to the original size in accordance with the contraction of the cooled resin after being pressurized, so that the resin can be packed during the cooling process, thereby minimizing the residual strain of the resin and preventing the generation of the sink marks. The optical characteristics of the optical component as used herein refer to properties evaluated by the degree of astigmatism and the uniformity of curvature distribution of the optical surface.

Still additionally, as a result of defining the external profile of the optical component by the elastic member, the outer peripheral edge of the molded optical component is free from burrs and marks of spilled resin and the gate so that the molded optical product can be taken out of the elastic member without requiring any further treatments such as cutting, edging and gate cutting, thereby improving the production efficiency.

Materials that can be used as raw material resin for the purpose of the invention include polycarbonate (PC), polymethylmethacrylate (acryl, PMMA), polyolefin (PO) and other thermoplastic resin materials.

The molded optical component may be a plus-power lens having a thickness that is greater at the center than at the peripheral edge, a minus-power lens having a thickness that is smaller at the center than at the peripheral portion and an aspherical lens such as a progressive lens and a single vision lens. Though a minus-power lens is apt to produce sink marks in the peripheral portion thereof because of the thicker peripheral portion, such sink marks can be effectively prevented because the peripheral portion is packed.

In another aspect of the present invention, there is provided a device for producing an optical component, the device having a mold having an optical component molding cavity thereinside and a pressurizing unit for clamping the mold and pressurizing the raw material resin in the optical component molding cavity, the pressurizing unit applying pressure to the plasticized raw material resin after the resin is plasticized to distribute the resin to mold the optical component, in which an annular elastic member is arranged in the optical component molding cavity so as to enclose the outer periphery of the raw material resin in the distributing direction in order to restrict the distribution of the resin and define an external profile of the optical component.

With the device for producing an optical component according to the present invention, it is possible to reduce the amount of raw material resin and also the cost of producing the mold. Additionally, it is possible to improve the optical characteristics of the optical component.

Preferably, the mold is provided with a heating unit for heating and plasticizing the raw material resin and the raw material resin is plasticized by the heating unit after the resin is set in position in the optical component molding cavity.

With such an arrangement, since the raw material resin is heated by the heating unit arranged in the mold so that it is not necessary to inject resin that is melted in advance and it is only necessary to place solid raw material resin (preform) of a predetermined measured amount in the cavity, thereby simplifying the structure of the producing device.

Preferably, the device for producing an optical component according to the invention is provided with a preheating unit for preheating the raw material resin in advance before it is set in position in the optical component molding cavity.

The preheating unit may be a heater directly heating the raw material resin from the outside or a heater heating the raw material resin from inside typically by means of far infrared rays and the like.

With such an arrangement, the raw material resin placed in the cavity can be quickly plasticized to reduce the time necessary for producing the optical component because the raw material resin is preheated. When the raw material resin is heated from the inside by means of a far infrared heater, the raw material resin is uniformly heated and plasticized when the raw material resin is heated from the outside by the heating unit of the mold.

The device for producing an optical component according to the present invention may be provided with an injection unit for plasticizing the raw material resin and injecting the plasticized raw material resin so that the raw material resin injected from the injection unit into the optical component molding cavity is pressurized and distributed by the pressurizing unit.

With such an arrangement, it is possible to use a molding method and a molding device having a configuration similar to conventional injection compression molding. Additionally, since raw material resin is plasticized and injected into the cavity by the injection unit, it is not necessary to provide the mold with a plasticizing unit such as a heating unit, so that the structure of the mold can be simplified.

Preferably, the mold is provided with a cooling unit for cooling the raw material resin that is pressurized and forced to stretch by the pressurizing unit.

With such an arrangement, since the distributed raw material resin is cooled by the cooling unit so that the resin can be quickly solidified before taking out the molded product, thereby accelerating the production cycle and improving the production efficiency.

Preferably, the elastic member is provided at the inner peripheral edge thereof with annular ripples that project in the mold clamping direction and extend along the inner peripheral edge.

With such an arrangement, the ripple of the elastic member that extends along the inner peripheral edge thereof is brought into close contact with the molding surfaces of the mold to hermetically seal the cavity so that the raw material resin is prevented from leaking through between the elastic member and the molding surfaces of the mold and the gas generated from the inside of the raw material resin as a result of applying pressure thereto can be discharged from between the ripples and the molding surfaces of the mold.

Preferably, the elastic member is made of fluorocarbon rubber with hardness of not lower than 40.

The hardness refers to the one as observed according to "the Method of Testing the Hardness of Vulcanized Rubber and Thermoplastic Rubber (JIS K6353-1997)", using a durometer Type A (Shore A). The hardness of fluorocarbon rubber is preferably not lower than A40, more preferably between A60 and A90, most preferably between A70 and A80. Note that the hardness observed by a durometer Type A (JIS K6353-1997) matches the one defined in ISO7619.

With such an arrangement, since the elastic member shows a hardness not lower than A40, the distribution of the raw material resin is restricted while packing the molded product from the outer peripheral side. Additionally, since the elastic member is made of fluorocarbon rubber, it can be separated easily from the molded optical component, so that the optical component can be easily taken out from the elastic member.

While the elastic member is preferably made of fluorocarbon rubber, it may alternatively be made of other rubber (e.g. silicon rubber), resin (e.g., fluorine resin) and some other highly heat-resistant material.

Preferably, the optical component is a spectacle lens and the elastic member has an inner peripheral edge that matches the profile of a frame of the spectacle.

With such an arrangement, since the inner peripheral edge of the elastic member matches the profile of the spectacle frame, the lens can be fitted to the spectacle frame without scraping off or by scraping only slightly a peripheral portion of the molded optical component, so that it is possible to save raw material resin and reduce the processing time of the spectacle lens.

Preferably, the mold includes a first mold for forming one of the optical surfaces of the optical component and a second mold opposing the first mold to form the other optical surface and a rotary unit is connected to at least tone of the first mold and the second mold, the rotary unit rotating the at least one of the first mold and the second mold around an optical axis of the optical component to be formed.

With such an arrangement, the mold can be positioned easily and quickly in circumferential directions by rotating the mold around the optical axis of the optical component even when the optical component to be molded is a progressive multi-focus lens.

Preferably, the mold includes a first mold for forming one of the optical surfaces of the optical component and a second mold opposing the first mold to form the other optical surface and at least either the molding surface of the first mold or that of the second mold is made of glass.

With such an arrangement, a chemically tempered glass mold to be used for cast molding of a plastic spectacle lens can be used as the mold having glass-made molding surface, so that an optical component (particularly, a spectacle lens prescribed for astigmatism) can be produced at low cost. More specifically, when a spectacle lens is prescribed for astigmatism, astigmatism surface is formed on the concave surface of the lens, so that the concave surface becomes a refractive surface of a combination of two lens-powers, i.e. vertex power and astigmatic power, which requires a large number of molds. Accordingly, the production cost is increased with the use of metal molds. However, the production cost can be reduced with the use of generally available glass-made mold (glass mold).

In still another aspect of the present invention, there is provided an optical component molded by a method of producing an optical component according to the present invention, the optical component being a spectacle lens.

According to the above aspect, the same advantages as the above-described advantages, i.e. reduction of the raw material resin and exhibition of excellent optical characteristics, can be obtained.

Preferably, an optical component according to the present invention is a spectacle plus-power lens and the raw material resin is made to show a profile internally contacting the mold.

With such an arrangement, since the raw material resin (preform) for a spectacle plus-power lens shows a profile that internally contacts the mold, i.e. the raw material resin contacts the molding surfaces of the mold at a central part thereof (e.g. double convex profile), the raw material resin is smoothly distributed during the pressurizing/molding process, so that profile accuracy can be improved and generation of air bubbles in the resin can be restrained. In other words, since the preform is pressurized to be distributed from a central part toward the outer periphery thereof, the resin can be more smoothly distributed and the generation of bubbles in the preform can be restrained as compared with a preform of which outer portion is in contact with the mold.

DETAILED DESCRIPTION OF PREFERRED EMBODIMENTS

Embodiments of the present invention will be described below with reference to the accompanying drawings.

Note that the components of the second embodiment and other embodiments, if any, that are same as or similar to those of the first embodiment will be denoted respectively by the same reference symbols and will not be described any further.

First Embodiment

Figure 1:
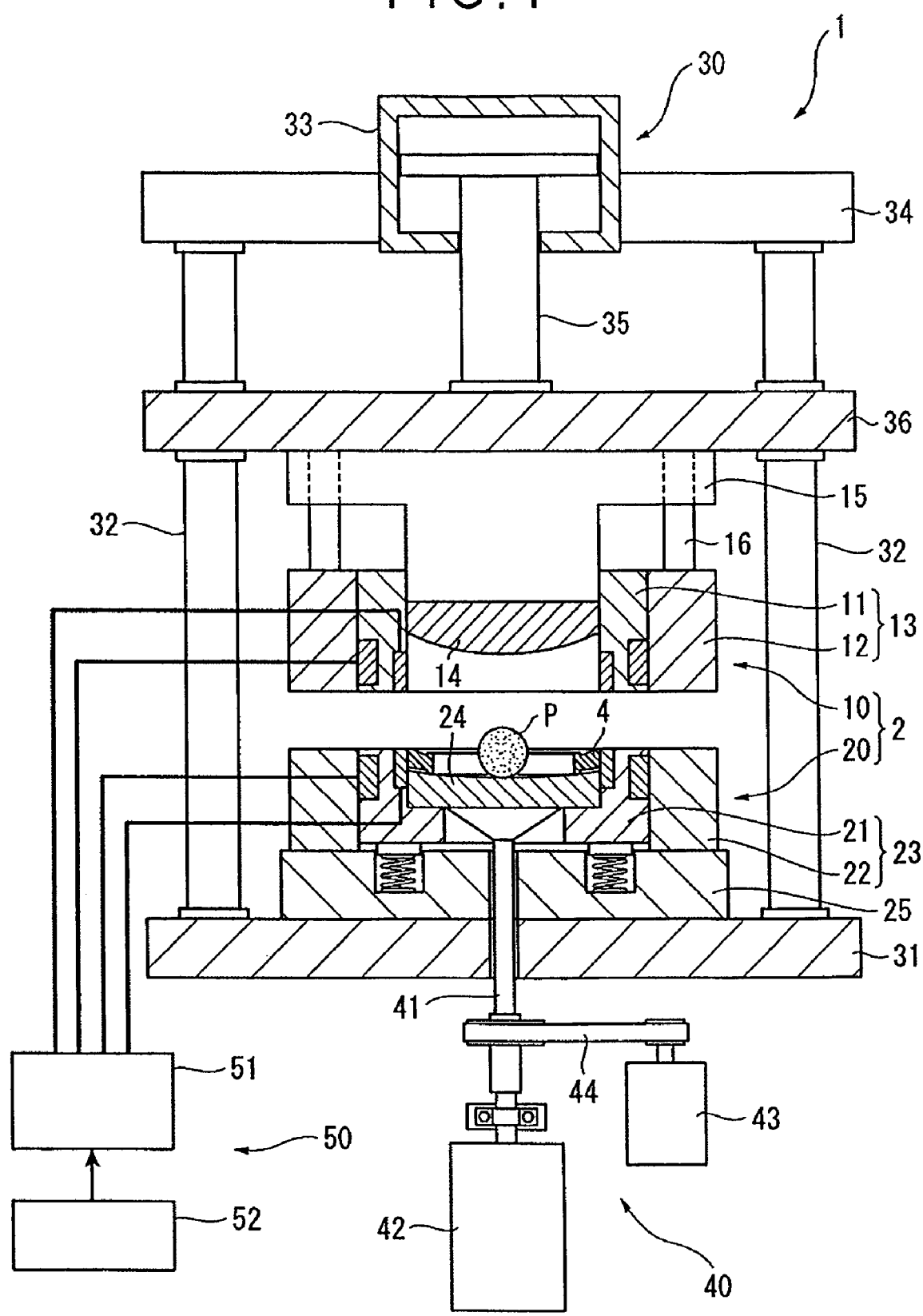
FIG. 1 is a schematic illustration showing the configuration of a device for producing an optical component to which a method of producing an optical component according to a first embodiment of the present invention is applied.

FIG. 1 is a schematic illustration of a device 1 for producing an optical component to which a method of producing an optical component according to a first embodiment of the present invention is applied, showing the. The optical component molded here is a minus spectacle lens (meniscus-shaped spectacle lens) whose thickness is greater at the central part than at the peripheral portion thereof.

The producing device 1 is a heating/pressurizing molding device that includes a mold clamping unit 30 containing a molding die 2, a positioning unit 40 for positioning the molding die 2 and a mold temperature regulating unit 50 for controlling the temperature of the molding die 2 at a predetermined temperature.

The mold clamping unit 30 includes a fixed die plate 31, a cylinder anchoring plate 34 rigidly secured to the fixed die plate 31 by way of a plurality of tie bars 32 and carrying a mold clamping cylinder 33 and a movable die plate 36 arranged so as to be elevatable along the tie bars 32 and linked to the piston rod 35 of the mold clamping cylinder 33. The molding die 2 is arranged in position between the fixed die plate 31 and the movable die plate 36 so that the molding die 2 is clamped as the movable die plate 36 is lowered by means of the mold clamping cylinder 33. In other words, the pressurizing unit for pressurizing the preform P, or the raw material resin, placed in position in a cavity 3 of the molding die 2 is constituted by the mold clamping unit 30.

The positioning unit 40 includes a connecting rod 41 that is linked to the lower mold insert 24 of the lower molding die 20, which will be described below, a positioning cylinder 42 that vertically drives the connecting rod 41 and a positioning motor 43 for driving the connecting rod 41 to rotate around the axis thereof. The connecting rod 41 and the positioning motor 43 are linked to each other by way of a pulley 44 (or gears) so that the rotary motion of the rotary shaft of the positioning motor 43 is transmitted to the connecting rod 41. The above-described connecting rod 41, the positioning motor 43 and the pulley 44 (and the gears) constitute the rotary unit for driving the lower mold insert 24, which is part of the molding die 2, around the optical axis of the lens L to be molded.

The mold temperature regulating unit 50 includes a temperature regulating fluid supply unit 51 for supplying temperature regulating fluid (heating fluid and cooling fluid) to the molding die 2 and a control unit 52 for controlling the temperature of the temperature regulating fluid being supplied from the temperature regulating fluid supply unit 51 to different parts of the molding die 2. The control unit 52 memorizes in advance a plurality of different mold temperature control curves that are to be used selectively depending on the type of the lens L to be molded. When one of the mold temperature control curves is designated, the temperature of the temperature regulating fluid supplied from the temperature regulating fluid supply unit 51 to different parts of the molding die 2 (including insert guide members 11, 21, upper mold insert 14 and lower mold insert 24, which will be described below) is controlled according to the designated mold temperature control curve. Thus, the mold temperature regulating unit 50 operates both as a heating unit for heating the molding die 2 and the preform P and as a cooling unit for cooling the molding die 2 and the preform P.

Figure 2:
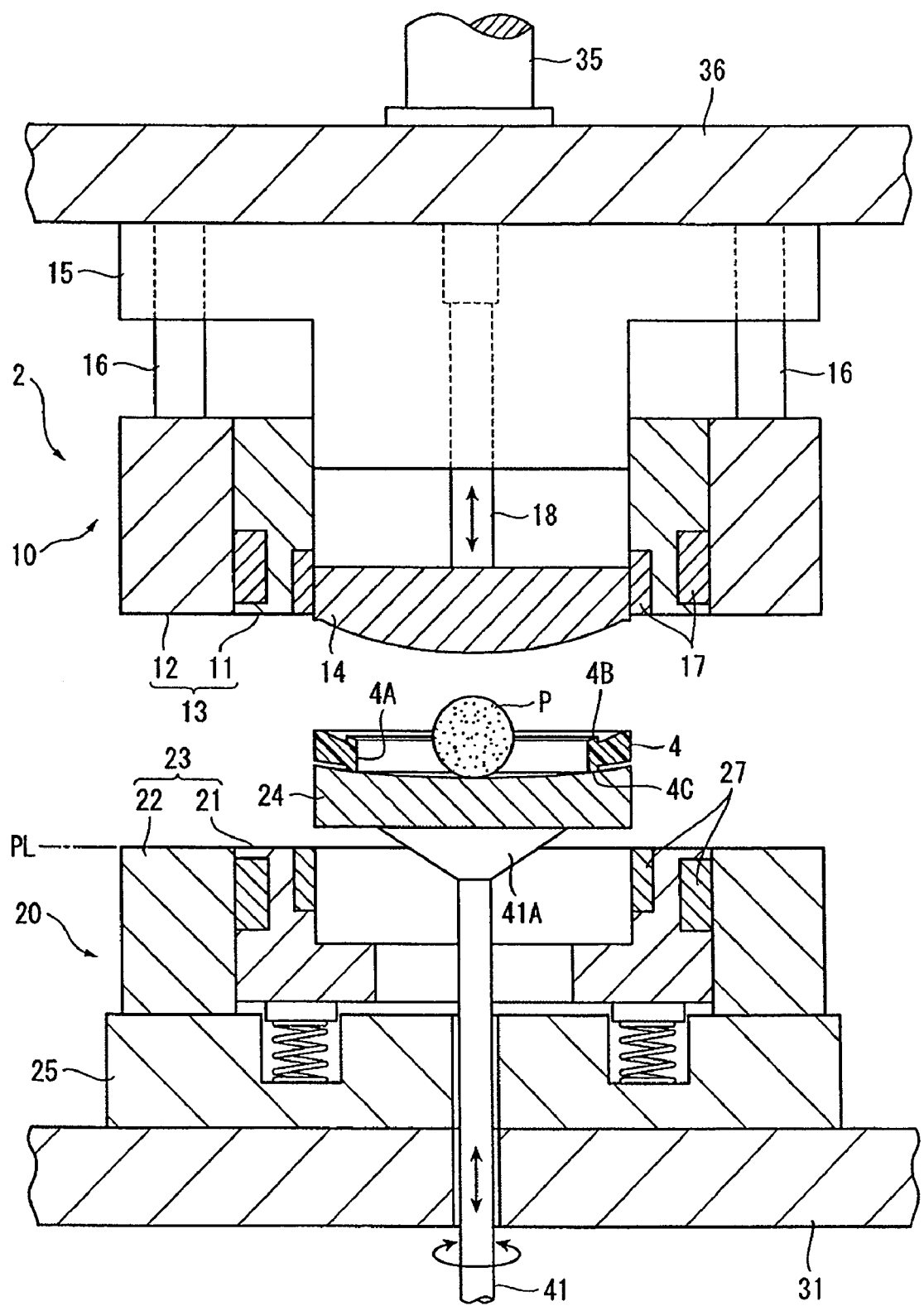
FIG. 2 is a cross sectional view showing the mold of the device of FIG. 1.
Figure 3:
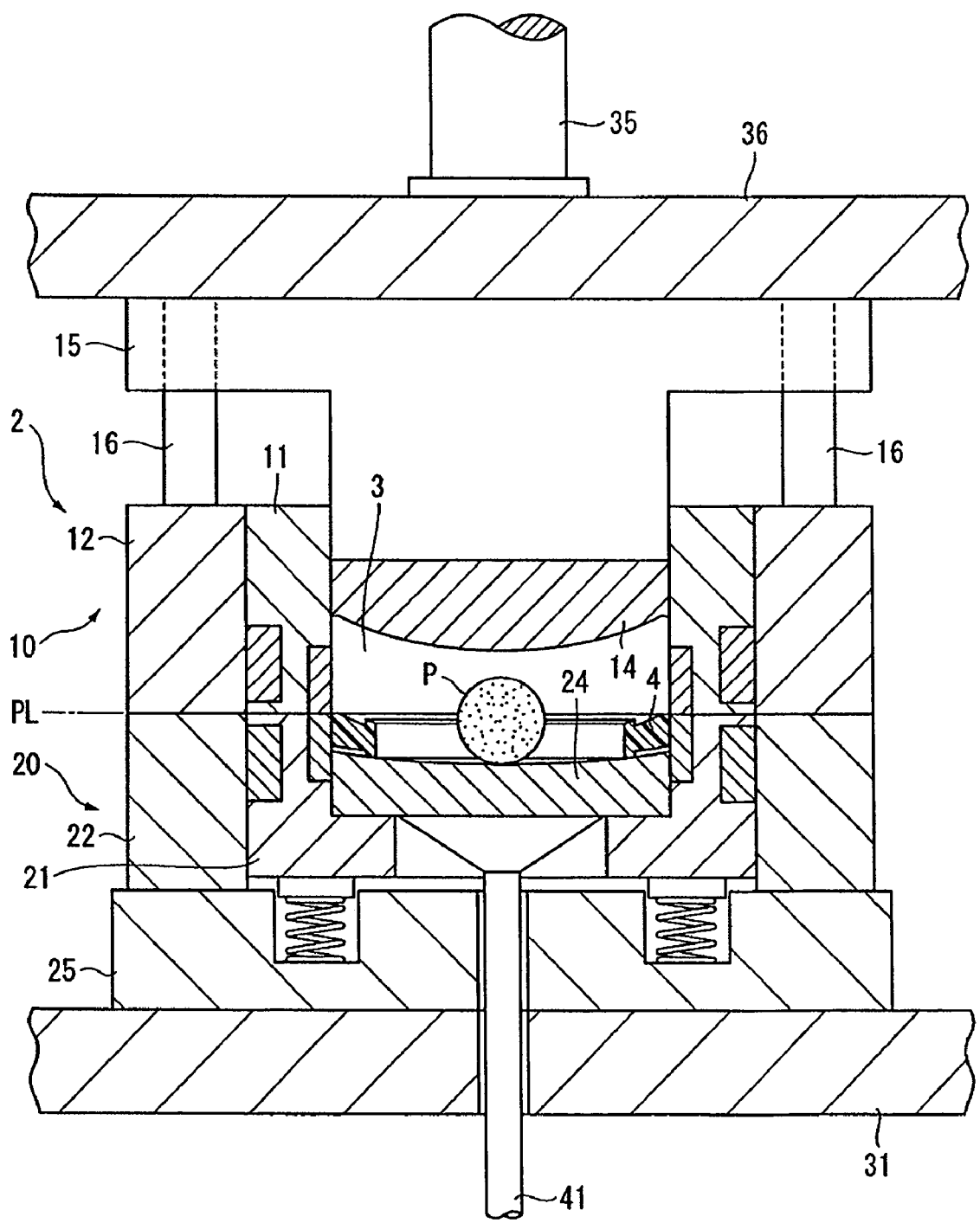
FIG. 3 is a cross sectional view showing the mold of the device of FIG. 1 in a molding step different from that of FIG. 2.
Figure 4:
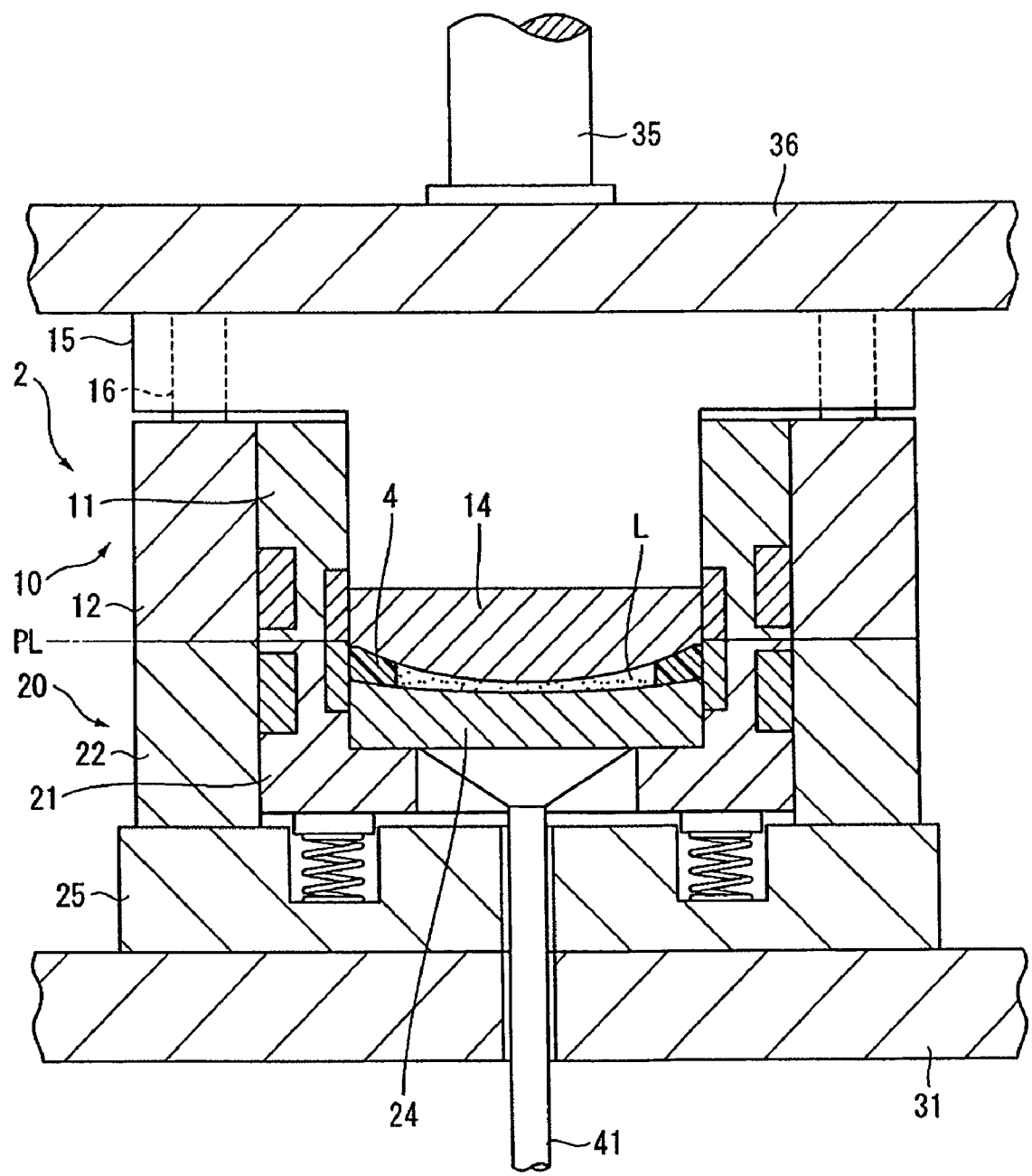
FIG. 4 is a cross sectional view showing the mold of the device of FIG. 1 in a molding step different from those of FIGS. 2 and 3.

FIGS. 2 through 4 are enlarged schematic cross sectional views of the molding die 2.

Referring to FIGS. 2 through 4, the molding die 2 includes an upper mold (movable mold) 10 and a lower mold (fixed mold) 20 that are separated from each other at a parting line PL as the upper mold 10 is driven to move upward. A lens (optical component) molding cavity 3 (FIG. 3) is defined between the two molds 10 and 20.

The upper mold 10 includes a mold main body 13 that is formed by combining an insert guide member 11 and a mold plate 12, an upper mold insert (optical insert, first mold) 14 that is contained in the inside of the insert guide member 11 to define the cavity 3 and a mold fitting member 15 to which the mold main body 13 and the upper mold insert 14 are fitted. The mold main body 13 of the upper mold 10 is linked to the mold fitting member 15 by means of bolts 16 and urged toward the lower mold 20 by a spring (not shown) to be supported in a manner movable toward and away from the mold fitting member 15. The mold fitting member 15 is rigidly secured to the movable die plate 36 so that the downwardly directed clamping force of the mold clamping cylinder 33 (FIG. 1) is applied to the upper mold insert 14 by way of the mold fitting member 15 to pressurize the preform P by means of the upper mold insert 14 as shown in FIGS. 3 and 4.

The lower mold 20 includes a mold main body 23 that is formed by combining an insert guide member 21 and a mold plate 22, a lower mold insert (optical insert, second mold) 24 contained in the inside of the insert guide member 21 and opposing the upper mold insert 14 to produce the cavity 3 and a mold fitting member 25 to which the mold main body 23 and the lower mold insert 24 are rigidly fitted. The mold main body 23 of the lower mold 20 is rigidly fitted to the fixed die plate 31 by way of the mold fitting member 25.

The insert guide members 11, 21 of the upper mold 10 and the lower mold 20 are provided with respective temperature regulating fluid circulation grooves 17, 27 for circulating temperature regulating fluid that is supplied from the temperature regulating fluid supply unit 51.

As shown in FIG. 2, the upper mold insert 14 of the upper mold 10 is removably engaged with the connecting rod 18 that is made to run through the mold fitting member 15. The connecting rod 18 is vertically projectable toward and away from the mold fitting member 15. As the connecting rod 18 is driven to project downward, the upper mold insert 14 is descended to be projected downward from the insert guide member 11 so that it can be replaced there. As the connecting rod 18 is retracted into the insert guide member 11, the top side of the upper mold insert 14 abuts to the bottom side of the mold fitting member 15 so that the mold clamping force can be transmitted to the upper mold insert 14.

The lower mold insert 24 of the lower mold 20 is mounted on a mounting section 41A arranged on the top end of the connecting rod 41 and removably engaged with the mounting section 41A. The lower mold insert 24 becomes replaceable when the connecting rod 41 is driven upward by means of the positioning cylinder 42 and projected from the insert guide member 21. After driving the connecting rod 41 to rotate by the positioning motor 43 and setting the lower mold insert 24 at a predetermined circumferential position, the lower mold insert 24 is set in position in the insert guide member 21 by driving the connecting rod 41 downward.

As shown in FIGS. 2 through 4, an annular insert 4 that is a elastic member made of hard rubber is arranged on the top side of the lower mold insert 24 located in the inside of the cavity 3 between the upper and lower mold inserts 14, 24. When the upper mold 10 is clamped by means of the mold clamping cylinder 33 and the upper mold insert 14 is driven to move downward toward the lower mold insert 24, the annular insert 4 is in close contact with the upper and lower mold inserts 14, 24 to define the outer peripheral edge of the cavity 3 and hence the external profile of the lens L to be molded.

The annular insert 4 is made of fluorocarbon rubber showing a hardness not lower than A40 as observed in terms of a durometer Type A and having excellent strength and heat-resistance. The hardness of the annular insert 4 is preferably between A60 and A90, and more preferably between A70 and A80. While the annular insert 4 is preferably made of fluorocarbon rubber, it may alternatively be made of silicon rubber, fluorine resin and the like.

Figure 5:
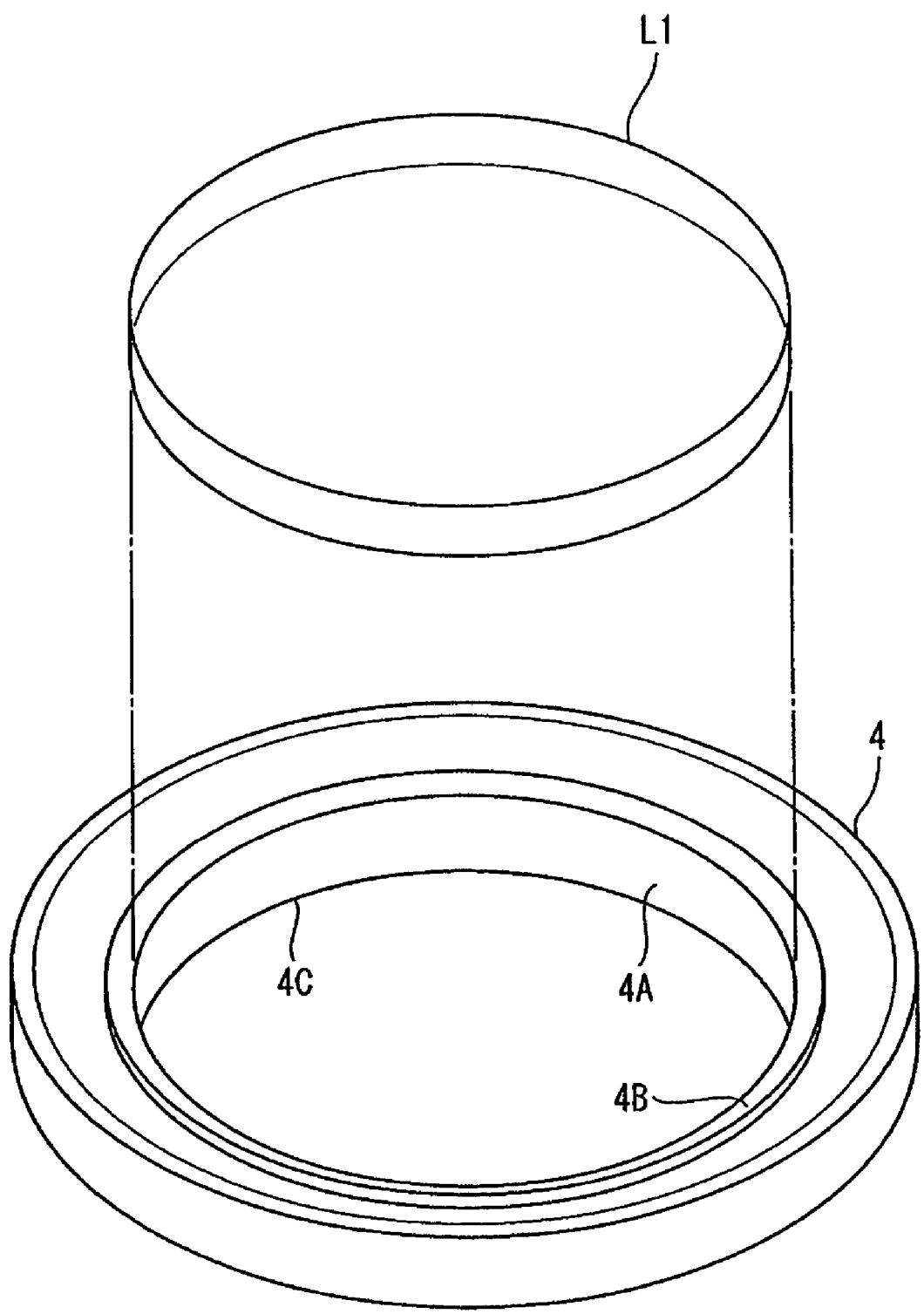
FIG. 5 is a perspective view of the optical component and an elastic member.

FIG. 5 is a schematic perspective view of the annular insert 4 and the lens L1 of this embodiment.

The annular insert 4 shows a substantially ring-shaped profile with a top side running along the molding surface of the upper mold insert 14, a bottom side running along the molding surface of the lower mold insert 24 and an inner peripheral edge 4A defined as a function of the external profile of the lens L1. The inner peripheral edge 4A of the annular insert 4 is provided with an upper ripple 4B that is a projecting section projecting toward the molding surface of the upper mold insert 14 from the top side of the annular insert 4 and a lower ripple 4C that is a projecting section projecting toward the molding surface of the lower mold insert 24 from the bottom side of the annular insert 4. The upper and lower ripples 4B, 4C have an annular profile extending along the inner peripheral edge 4A of the annular insert 4 so that they come into close contact with the molding surfaces of the upper and lower mold inserts 14, 24 prior to the top side and the bottom side thereof at the time of clamping the mold. As the annular insert 4 is pressed by the upper mold insert 14, the upper and lower ripples 4B, 4C are elastically deformed to be in close contact respectively with the molding surfaces of the upper and lower mold inserts 14, 24, so that the sealingness of the cavity 3 can be secured.

Figure 6:
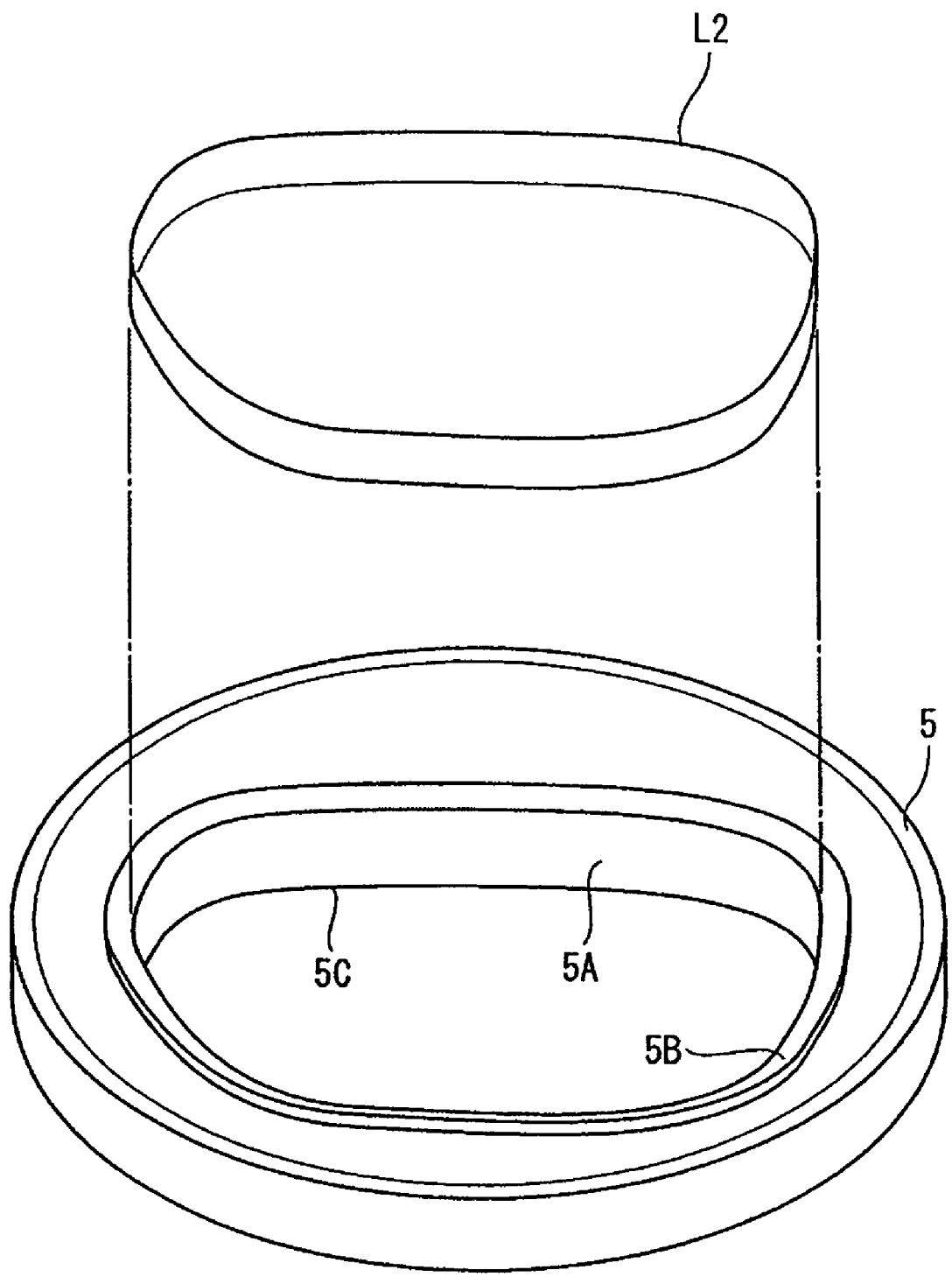
FIG. 6 is a perspective view of an optical component and an elastic member that are different from those of FIG. 5.

FIG. 6 is a schematic perspective view of an annular insert 5 and a lens L2 according to a modification of the present embodiment.

Like the annular insert 4 of FIG. 5, the annular insert 5 illustrated in FIG. 6 shows a substantially ring-shaped profile with an inner peripheral edge 5A that is defined as a function of the external profile of the lens L2 and has upper and lower ripples 5B, 5C that extend along the inner peripheral edge 5A. The inner peripheral edge 5A of the annular insert 5 is formed so as to match the shape of the spectacle frame for receiving the lens L2 so that the lens L2 formed by using the annular insert 5 can be fitted to the spectacle frame without significantly scraping off the peripheral edge of the lens L2 in a simple operation.

Now, the molding process of the optical component (lens L) by the producing device 1 of this embodiment will be described below.

Firstly, the movable die plate 36 and the upper mold 10 are raised by means of the mold clamping cylinder 33 to make the molding die 2 wide open.

The upper and lower mold inserts 14, 24 are replaced, if necessary, depending on the type of the lens L to be molded while the molding die 2 is wide open as shown in FIG. 2. When replacing the upper mold insert 14, the connecting rod 18 is driven to force the upper mold insert 14 to project downward from the insert guide member 11 and, thereafter, the connecting rod 18 is driven upward to house the upper mold insert 14 in the insert guide member 11. When replacing the lower mold insert 24, the positioning cylinder 42 of the positioning unit 40 is driven to force the lower mold insert 24 to project upward from the insert guide member 21.

Then, a solid preform (raw material resin) P of a quantity measured in advance to be equal to that of the lens L to be molded is set in position on the lower mold insert 24 and, at the same time, the annular insert 4 (5) selected according to the type and the size of the lens L is placed in position on the lower mold insert 24. Subsequently, the positioning motor 43 of the positioning unit 40 is driven to rotate the connecting rod 41 and the lower mold insert 24 in order to determine an optical layout of the lens L to be molded that matches the optical reference position of the lens L (positioning step). Then, the positioning cylinder 42 is driven downward so as to house the lower mold insert 24 in the insert guide member 21.

When the lens L has a preset optical layout as in a progressive multi-focus lens or a lens prescribed for astigmatism, the optical layout can be adjusted by driving the lower mold insert 24 (convex lens side) and determining the position in the direction of the axis of astigmatism in the positioning step. Alternatively, the positioning step may be omitted for molding a lens that does not require any positioning operation such as a spherical surface lens.

Then, as shown in FIG. 3, the movable die plate 36 is lowered to close the molding die 2 and the insert guide member 11 and the mold plate 12 of the upper mold 10 are made to respectively abut the insert guide member 21 and the mold plate 22 by means of the mold clamping cylinder 33. As a result, the cavity 3 is defined between the upper mold 10 and the lower mold 20. Further, the movable die plate 36 is lowered to push down the upper mold insert 14 by means of the mold fitting member 15 of the upper mold 10 until the molding surface of the upper mold insert 14 abuts to the preform P.

In the state where the upper mold insert 14 abuts the preform P, heating fluid is supplied from the temperature regulating fluid supply unit 51 of the mold temperature regulating unit 50 to the temperature regulating fluid circulating grooves 17, 27 of the insert guide members 11, 21 to heat up the insert guide members 11, 21 and the upper and lower mold inserts 14, 24 to a predetermined temperature. The predetermined temperature is a temperature that is higher than the glass transition temperature Tg of the preform P by about 10 to 80° C. The preform P is plasticized as a result of the heating (heating step).

Subsequently, the movable die plate 36 is lowered to push down the upper mold insert 14, so that the preform P is pressurized and distributed between the upper and lower mold insert 14, 24 by means of the mold clamping cylinder 33 (pressurizing step). Then, as shown in FIG. 4, when the upper and lower mold inserts 14, 24 are brought into tight contact with the annular insert 4 and the pressurized and distributed resin extends in the cavity 3 to reach the inner peripheral edge 4A of the annular insert 4, the distribution of the resin is restricted by the annular insert 4. Specifically, the mold clamping force applied by the upper and lower mold inserts 14, 24 and the clamping force from the annular insert 4 that has been elastically deformed to increase its diameter are applied to the resin. Note that the upper and lower ripples 4B, 4C of the annular insert 4 are tightly held in contact respectively with the molding surfaces of the upper and lower mold inserts 14, 24 so that the distributed resin would not leak to the outside of the annular insert 4.

After completing the step of heating and pressurizing the resin, cooling fluid is supplied from the temperature regulating fluid supply unit 51 of the mold temperature regulating unit 50 to the temperature regulating fluid circulating grooves 17, 27 of the insert guide members 11, 21 to cool and solidify the resin (cooling step). At this time, the volume of the resin is reduced as the resin is solidified, in accordance with which the original inner diameter of the annular insert 4 is restored, so that the clamping force of the annular insert 4 is continuously applied to the resin while being solidified. When the resin is completely solidified, the movable die plate 36 is raised to open the molding die 2 to complete the molding process of the lens L.

As shown in FIGS. 5 and 6, the external profile of the molded lens L is defined by the annular insert 4 or 5. The lens L is taken out from the molding die 2 with the annular insert 4 or 5, which is further taken out from the annular insert 4 or 5 and the lens L is subjected to a subsequent surface treatment (coating) process and an edge scraping process, if necessary, to become a finished spectacle lens.

Figure 7:
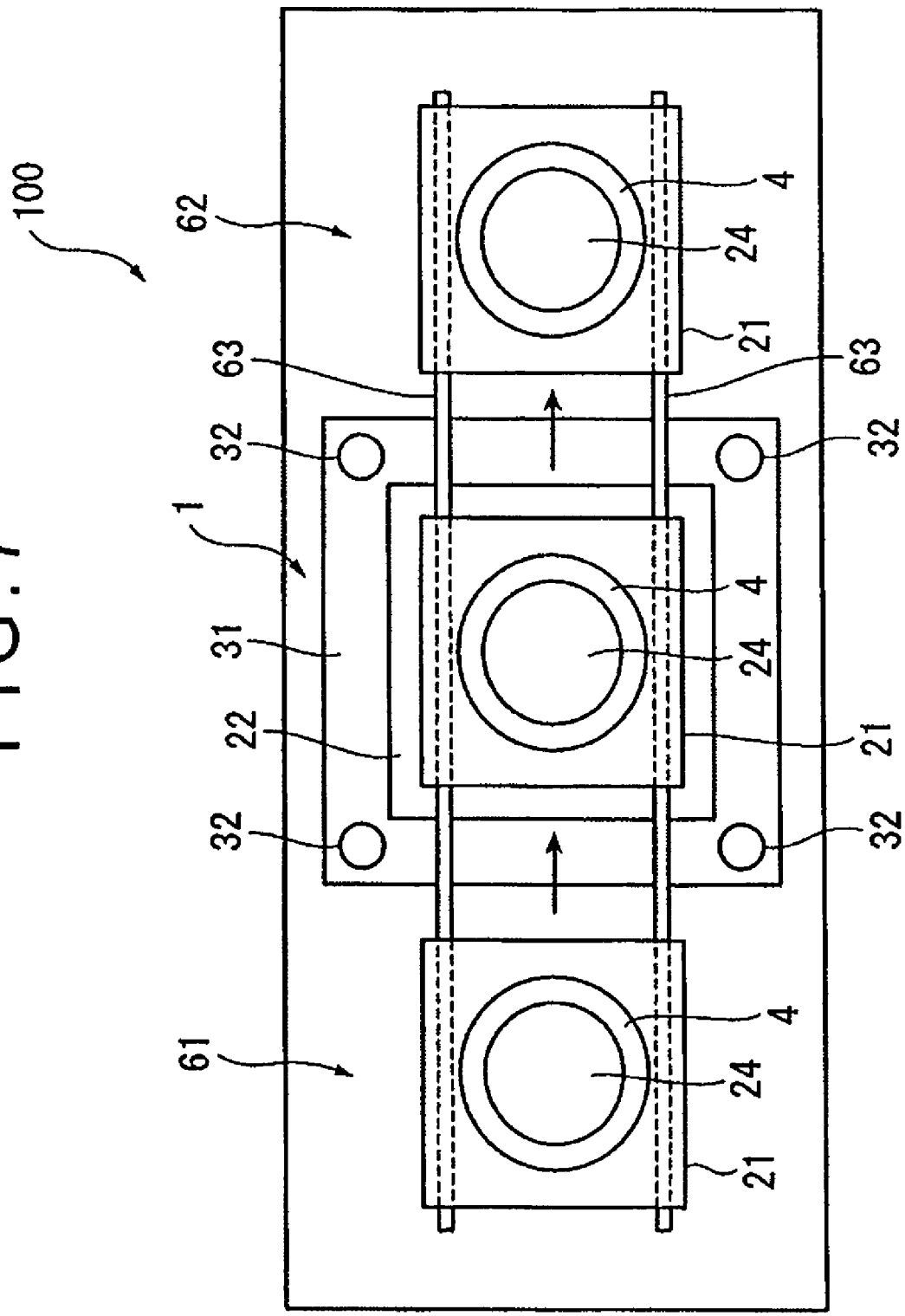
FIG. 7 is a plan view of a production line including the device of FIG. 1.
Figure 8:
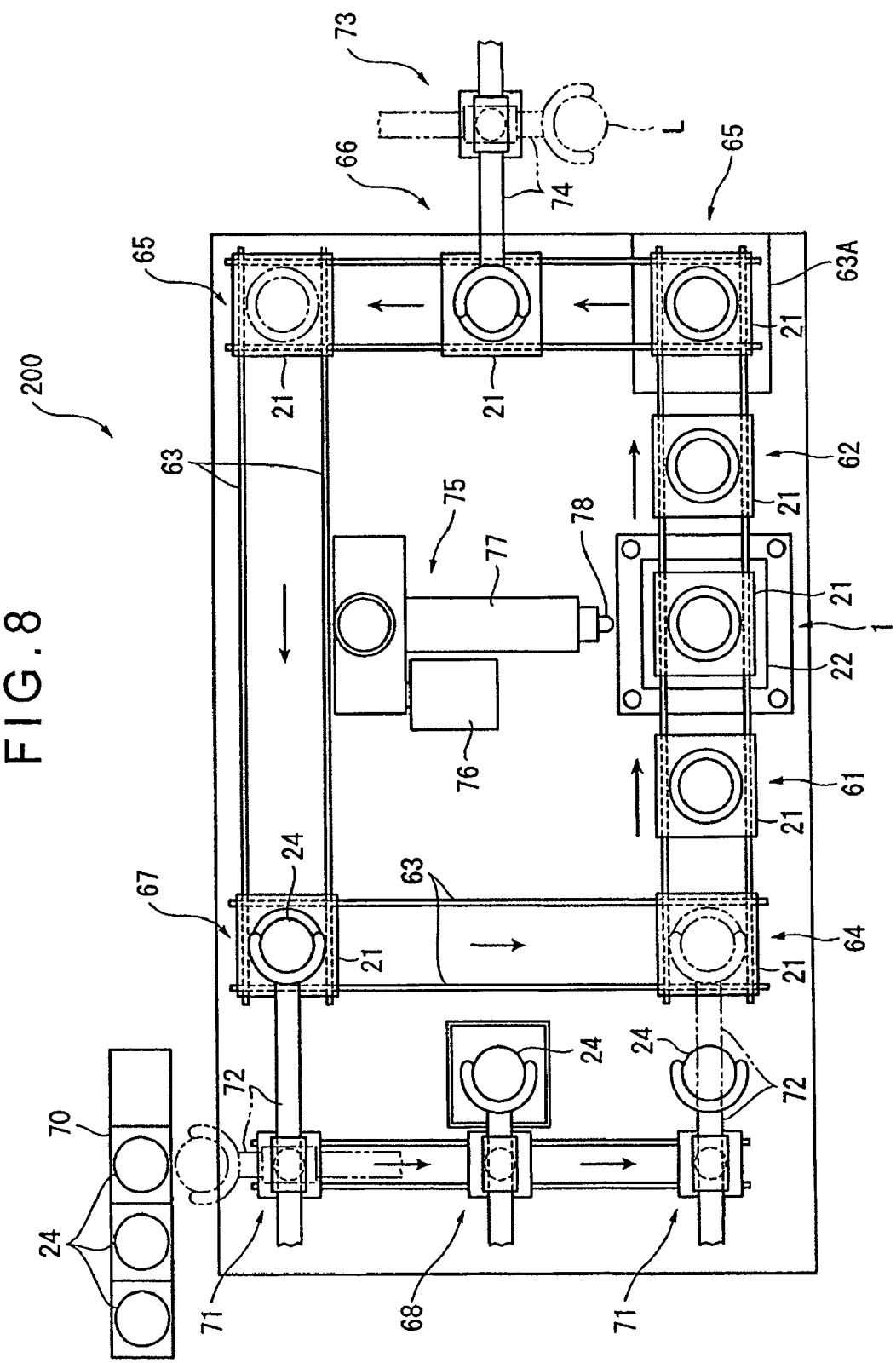
FIG. 8 is a plan view of another production line different from that of FIG. 7.

As shown in FIGS. 7 and 8, the producing device 1 of this embodiment can be combined with various peripheral devices to form a production line.

FIGS. 7 and 8 are schematic plan view of production lines 100, 200 realized by using the producing device 1 of this embodiment.

Referring to FIG. 7, the production line 100 includes the producing device 1, a preheating stage 61 and a cooling stage 62 arranged respectively on upstream and downstream relative to the producing device 1 and a transfer system 63 for transferring the lower mold insert guide member 21 and the lower mold insert 24 between the preheating stage 61 and the cooling stage 62.

The preheating stage 61 is provided with a far infrared heater (not shown) as a preheating unit so as to preheat the preform P set in position on the lower mold insert 24 (preheating step). The temperature selected for the preheating process is higher than the glass transition temperature Tg of the preform P by about 10 to 80° C. The preform P that has been preheated to the selected temperature is transferred to the producing device 1 along with the insert guide member 21 and the lower mold insert 24 by the transfer system 63. The transferred insert guide member 21 is set in the mold plate 22 of the producing device 1 and a lens is molded in accordance with the above-described molding process (without the cooling step).

The molded lens is transferred to the cooling stage 62 along with the insert guide member 21 and the lower mold insert 24 and cooled by the cooling stage 62 (cooling step), and taken out of the production line 100. In sum, in the above-described production line 100, the lower insert 24, the annular insert 4 and the perform P for the next molding article is prepared and pre-heated in the pre-heating stage 61 while an article is molded in the producing device 1, and the precedingly molded article is cooled and ejected in the cooling stage 62, where the lower insert 24 and the annular insert 4 can be exchanged.

The production line 200 of FIG. 8 includes the producing device 1, the preheating stage 61 and the cooling stage 62 as in the production line 100 of FIG. 7, and additionally includes an insert installing stage 64, two idle stages 65, a lens takeout stage 66 and an insert takeout stage 67. The above stages are arranged sequentially in the order of the insert installing stage 64, the preheating stage 61, the producing device 1, the cooling stage 62, one of the idle stages 65, the lens takeout stage 66, the other idle stage 65 and the insert takeout stage 67. The transfer system 63 transfers the insert guide member 21 of the lower mold among the respective stages. The transfer system 63 is driven by a transfer system drive unit 63A. A coat application stage 68 for applying a coat, which may be formed by a hard coat agent, to the molding surface of the lower mold insert 24 is arranged between the insert takeout stage 67 and the insert installing stage 64.

An insert rack 70 for temporarily storing lower mold inserts 24 of various types in preparation for the coming processes is arranged near the insert takeout stage 67. An insert transfer system 71 is arranged between the insert takeout stage 67 and the insert installing stage 64 for the purpose of taking out the lower mold insert 24 from the insert guide member 21 of the insert takeout stage 67, putting it back to the insert rack 70, taking out an appropriate lower mold insert 24 from the insert rack 70, transferring it to the insert installing stage 64 and installing the lower mold insert 24 in the insert guide member 21 of the insert installing stage 64. The insert transfer system 71 is provided with a robot arm 72 for grasping the lower mold insert 24.

A product transfer system 73 is arranged near the lens takeout stage 66 for the purpose of taking out molded lens L from the insert guide member 21 of the lens takeout stage 66 and transfer it to the product rack (not shown). The product transfer system 73 is provided with a robot arm 74 for grasping the lens L.

The production line 200 includes an injection device 75 for injecting molten resin into the cavity 3 of the molding die 2 of the producing device 1. More specifically, in the production line 200, plasticized molten resin is injected into the cavity 3 by means of the injection device 75 in the molding process in stead of setting the preform P in position in the cavity 3 and heating and plasticizing the preform P. Thus, the lower mold insert 24 is preheated on the preheating stage 61 and the above-described heating step is omitted from the producing device 1.

The injection device 75 includes a material supply section 76 for supplying resin pellets, a plasticizing section 77 for heating and melting the supplied resin pellets that contains a screw for supplying molten resin to the producing device 1 and an injection nozzle 78 for injecting the molten resin into the cavity 3. Predetermined amount of measured molten resin of a predetermined measured amount is injected by the injection device 75.

With the above-described production line 200, a series of steps of selecting an appropriate lower mold insert 24 from the insert rack 70, installing it in the insert guide member 21, transferring the lower mold insert 24 to the producing device 1, injecting molten resin into the cavity 3, taking out the lens L molded in the producing device 1, taking out the lower mold insert 24 used for the molding from the insert transfer system 71 and returning the lower mold insert 24 to the insert rack 70 are automatically carried out according to a predefined producing sequence.

Although not described above, the insert guide member 11 and the upper mold insert 14 of the upper mold 10 are also transferred and set in position according to a predetermined transferring and setting sequence similar to the one described above for the lower mold 20.

While this embodiment is described above in terms of producing a single lens L, it is also possible to produce two or more number of lenses, using a pair of or a plurality of molds or increasing the number of the production lines.

The above-described embodiment provides the following advantages.

It is only necessary to prepare raw material resin by a quality equal to the volume of the space in the cavity 3 defined by the molding surfaces of the upper and lower mold inserts 14, 24 and the inner peripheral edges 4A, 5A of the annular insert 4 or 5 because the distribution of the resin in the cavity 3 is limited by the annular insert 4 or 5 and the external profile of the molded lens L is defined also by the annular insert 4 or 5. Thus, it is possible to save raw material resin.

When the lens L is used as spectacle lens, the inner diameter of the annular insert 4 is defined according to the size of the lens L to be used, thereby further reducing the amount of the raw material resin. Additionally, since it is not necessary to provide different molds 2 in accordance with the size of the lenses L to be molded, the production cost of the molding die 2 can be reduced.

Since the inner peripheral edge 5A of the annular insert 5 corresponds to the profile of the spectacle frame, it is not necessary to scrape the peripheral edge of the molded lens L2. Alternatively, lenses to be used with spectacle frames having similar profiles may be molded as a group and each of the lenses can be received in the corresponding spectacle frame by scraping the edge only to a slight extent. Thus, it is possible to further save raw material resin and reduce the number of processing steps of spectacle lenses.

Since the distribution of the raw material resin is restrained by the annular insert 4 or 5 so that the pressure being applied to the peripheral edge section of the lens L can be preserved, the molded lens L shows excellent optical characteristics. While the annular insert 4 or 5 is deformed by the pressure of the resin to increase its inner diameter, it restores its original diameter as the resin is cooled after pressurization so that the resin can be packed even in the cooling step so that the residual strain is consequently minimized to prevent sink marks.

When the lens L is a minus-power lens, it is apt to produce sink marks in the peripheral portion thereof because the peripheral portion is thicker. However, such sink marks can be effectively prevented from appearing in the peripheral portion because the resin can be packed in the annular inserts 4 and 5 from the periphery thereof.

As a result of defining the external profile of the lens L by the annular insert 4 or 5, the outer peripheral edge of the molded lens L is free from burrs and marks of spilled resin and the gate, so that the lens L can be taken out of the annular insert 4 or 5 without requiring any further treatments such as cutting, polishing and gate cutting to improve the production efficiency.

When the molding die 2 and the preform P are heated to plasticize the preform P by means of the temperature regulating fluid supply unit 51 of the mold temperature regulating unit 50, it is not necessary to inject resin that has been melted in advance into the cavity. In other words, it is only necessary to set a solid preform P of a predetermined amount in position in the cavity 3. Thus, it is possible to simplify the structure of the producing device 1.

When the preform P is preheated by the preheating unit, it is possible to quickly plasticize the preform P after setting it in position in the cavity 3 thereby reducing the number of producing steps. Additionally, if the preform P is heated from the inside by means of a far infrared heater, the entire preform P can be uniformly heated and plasticized when the preform P is heated from the outside by way of the insert guide members 11, 21 and the upper and lower mold inserts 14, 24.

While a spherical preform P is used in the embodiment for obtaining the effect of uniform distribution during the pressurizing step, the profile of preform P is by no means limited to spherical. A preform P having a profile that allows contact with the upper and lower mold 10 and 20 at a central part thereof (e.g., a preform having a convex profile on both sides) may preferably be used from the viewpoint of distribution effect and profiling precision.

When an injection device 75 for injecting molten resin is used to supply raw material resin, a molding method and device similar to conventional injection compression molding can be used for the above embodiment. Then, since the raw material resin is plasticized and injected into the cavity 3 by the injection device 75, it is not necessary to provide the molding die 2 with a plasticizing unit such as a heating unit, so that the structure of the molding die 2 can be simplified.

Since the distributed raw material resin is cooled by the temperature regulating fluid supply unit 51 of the mold temperature regulating unit 50, the molded lens L can be quickly solidified before being taken out, thereby accelerating the production cycle and improving the production efficiency.

Since the annular inserts 4, 5 are provided with ripples 4B, 4C and ripples 5B, 5C respectively, the ripples 4B, 4C and the ripples 5B, 5C tightly contact the molding surfaces of the upper and lower mold inserts 14, 24 to hermetically seal the cavity 3, the raw material resin is prevented from leaking through the gap, if any, between the annular insert 4 or 5 and the molding surfaces of the molding die 2 and the gas generated from the inside of the raw material resin as a result of applying pressure thereto can be discharged between the ripples 4B, 4C or ripples 5B, 5C and the molding surfaces of the molding die 2.

Since the annular inserts 4, 5 are made of hard rubber, it is possible to reliably restrain the distribution of the raw material resin and pack the outer peripheral side of the lens L. When the annular inserts 4, 5 are made of fluorocarbon rubber, they can be separated easily from the lens L so that the lens L can be easily taken out from the corresponding annular insert 4 or 5. Further, the use of fluorocarbon rubber of great strength for the annular inserts 4, 5 allows repeated use of the inserts, so that the production cost can be restrained.

The lower mold insert 24 is rotated around the optical axis of the lens L by means of the positioning motor 43 of the positioning unit 40, so that circumferential position of the lower mold insert 24 can be easily and quickly determined even in molding a progressive multi-focus lens.

Furthermore, the combination with various peripheral units as exhibited in the production lines 100 and 200 allows sequential production of the lenses L sequentially in a series of steps, thereby further improving the production efficiency. Particularly, since the size of the production line 100 may be made compact as a whole, the production line 100 may be installed in an optician's shop, where it is possible to produce a lens or lenses L in the shop, observing the eyes of the client (for the visual power, the presence of astigmatism, etc.), and provide the client with glasses on the spot, which is of great convenience.

Second Embodiment

Figure 9:
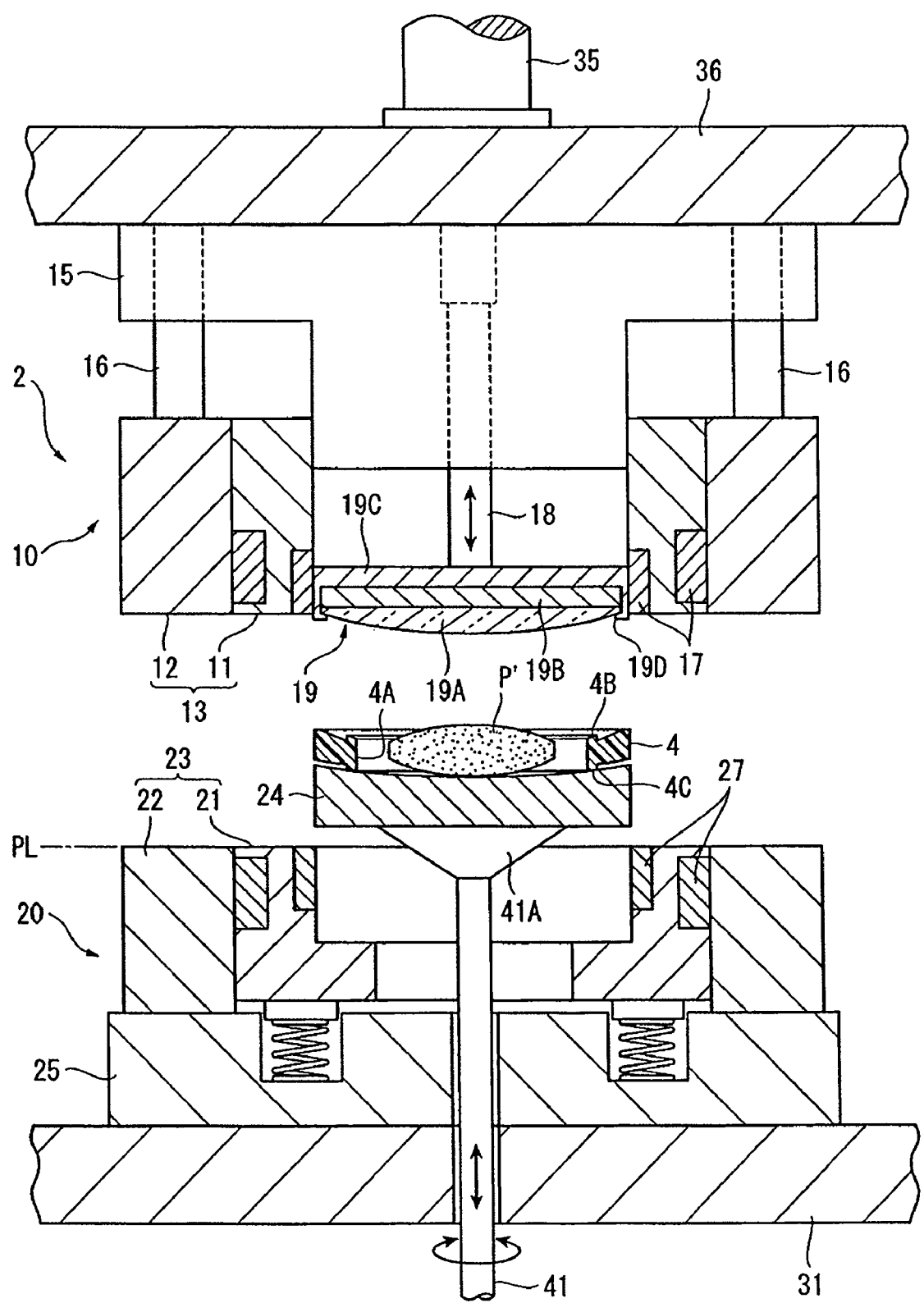
FIG. 9 is a schematic illustration showing the configuration of a device for producing an optical component according to a second embodiment of the present invention.
Figure 10:
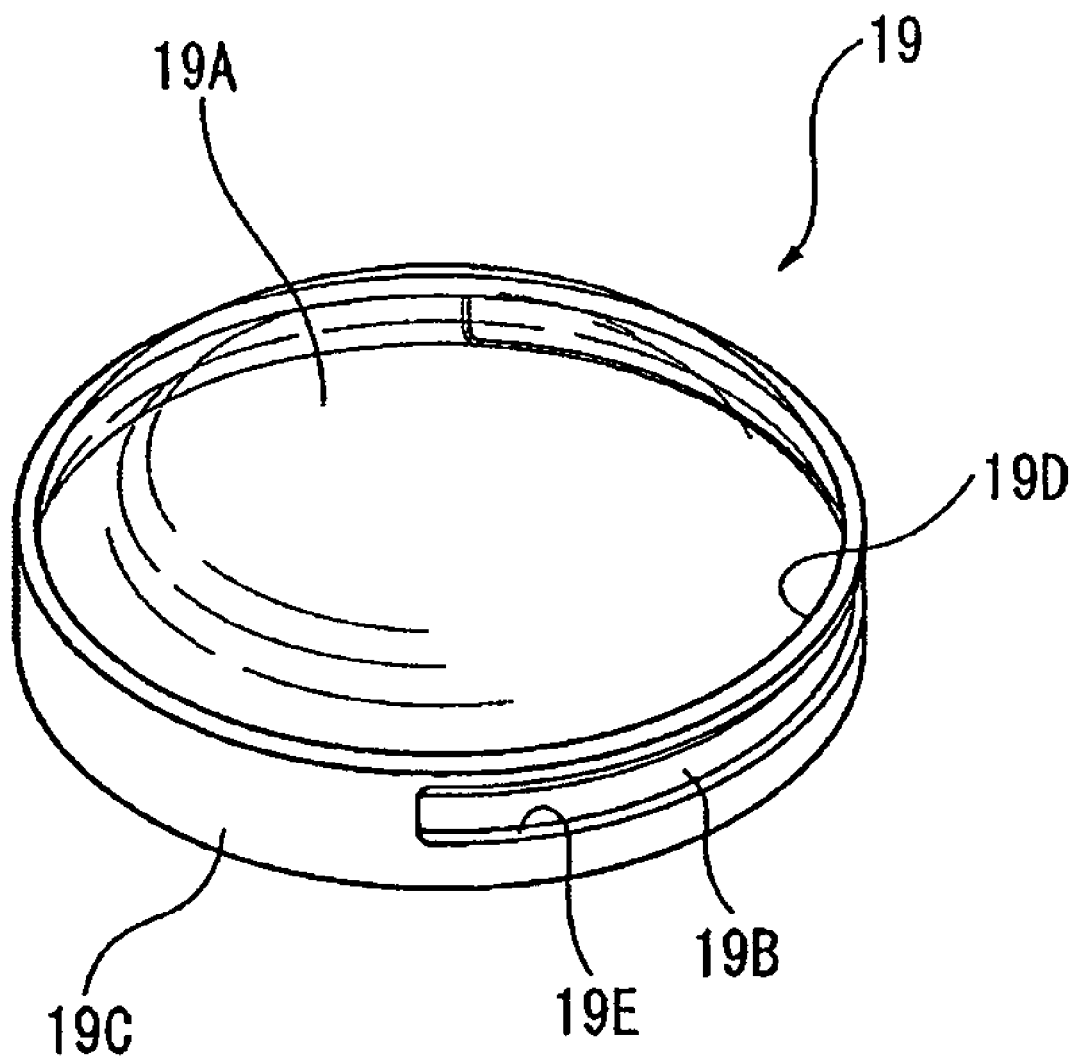
FIG. 10 is a perspective view of the mold of the device of FIG. 9.

FIG. 9 is an illustration schematically showing an arrangement of a device for producing an optical component according to the present embodiment. Like the first embodiment, the producing device according to the second embodiment of the present invention is a heating/pressurizing molding device that includes a mold clamping unit 30 containing a molding die 2, a positioning unit 40 for positioning the molding die 2 and a mold temperature regulating unit 50 for controlling the temperature of the molding die 2 to a predetermined temperature. The producing device of this embodiment differs from the first embodiment in terms of the configuration of the upper mold insert (first mold) of the upper mold 10 of the molding die 2. Now, the difference will be described in detail below.

The upper mold insert 19 of this embodiment includes a glass mold 19A that is made of glass and has a molding surface, a spacer 19B arranged at a side of the glass mold 19A opposite to the molding surface and a case body 19C for containing the glass mold 19A and the spacer 19B. The case body 19C has a round dish-like profile that is open toward the lower mold 20. A flange-shaped glass mold holder 19D is formed along the entire peripheral edge of the aperture of the glass mold holder 19D. The case body 19C is provided at the lateral surface thereof with an aperture 19E for allowing the glass mold 19A and the spacer 19B to be moved into and out of the case body 19C.

Figure 11:
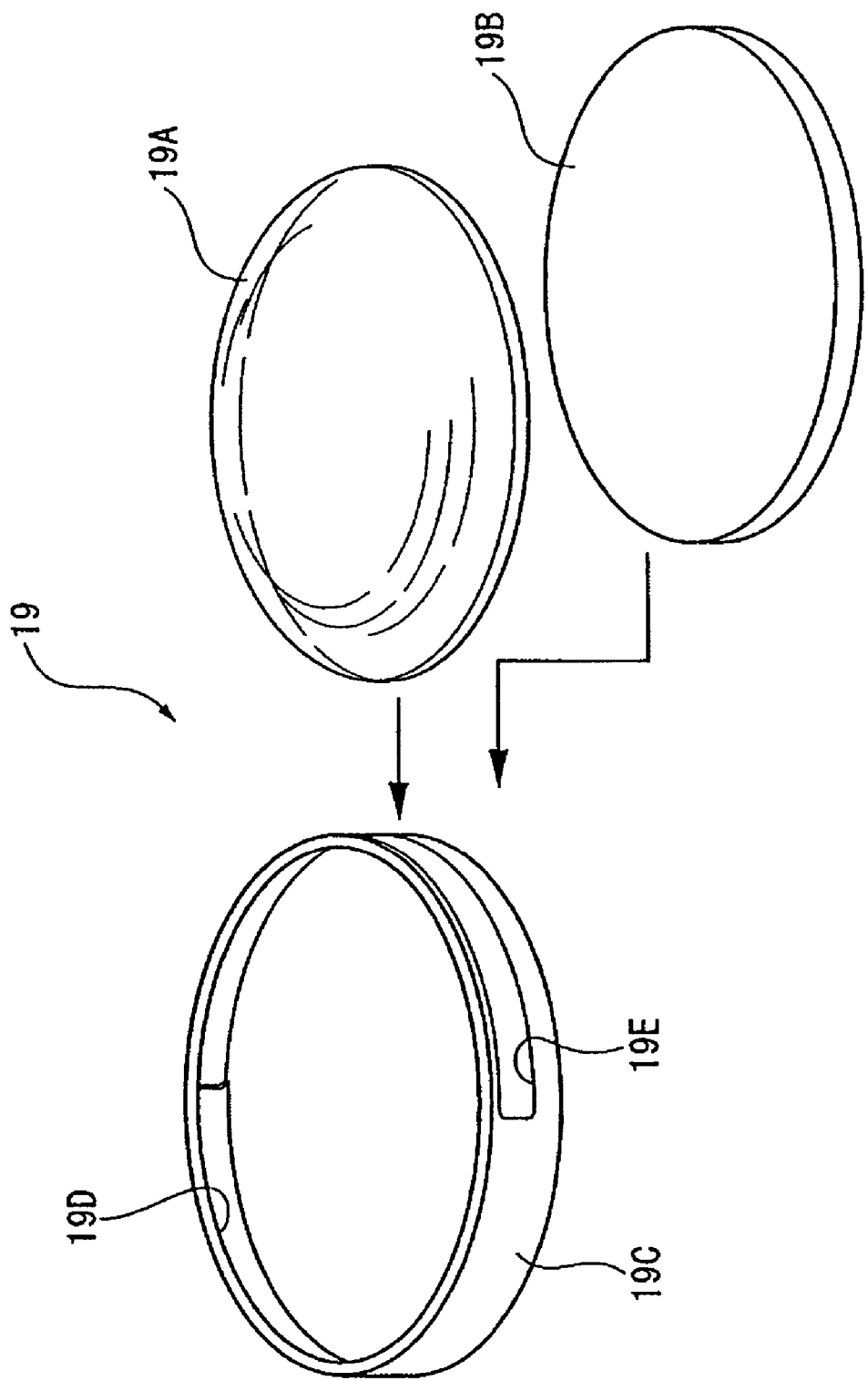
FIG. 11 is an exploded perspective view of the mold of FIG. 9.

When containing the glass mold 19A and the spacer 19B in the case body 19C, firstly the glass mold 19A is brought into the case body 19C through the aperture 19E toward the holder 19D as shown in FIG. 11. Then, the spacer 19B is brought into the case body 19C through the aperture 19E so as to press the glass mold 19A against the holder 19D to be positioned. Then, the case body 19C of the upper mold insert 19 is rigidly fitted to the connecting rod 18 as in the case of the first embodiment. Then, the upper mold insert 19 is contained in the insert guide member 11 and mounted in the upper mold 10.

The glass mold 19A is made of chemically tempered glass to be used for cast molding of a plastic spectacle lens. The molding surface (the lower surface in FIG. 9) of the glass mold 19A is a convex optical mirror surface to be transferred to the concave side of a lens L. The surface (the upper surface in FIG. 9) of the glass mold 19A opposite to the molding surface is the surface that is brought into contact with the spacer 19B so that it is subjected to secondary processing to be flat for the benefit of fittability. When, for example, the lens L to be molded is prescribed for astigmatism and an astigmatic surface is also to be formed on the concave side, a refractive surface having combined two different lens powers, i.e. vertical refractive force and astigmatic refractive force, is formed on the molding surface of the glass mold 19A and the refractive surface is transferred to the concave surface of the lens L.

The spacer 19B fills the gap in the case body 19C so that the glass mold 19A may not move in the case body 19C, which is made of a copper type metal or alloy that shows a high thermal conductivity and a high degree of processibility so that heat can be efficiently conducted to the glass mold 19A when the upper mold 10 is heated. The spacer 19B is highly precisely processed in terms of size and thickness according to the profile of the glass mold 19A and that of the case body 19C so that no play may be produced among the components of the upper mold 10 when pressure is applied thereto by the mold clamping unit 30.

The above-described glass mold 19A of the upper mold insert 19 is designed to be held in tight contact with the annular insert 4 arranged on the lower mold insert 24 during the pressurizing/molding process. The thickness and the profile of the annular insert 4 are defined by taking the pressure and the contraction that takes place during the molding process into consideration, where the glass mold 19A does not contact the lower mold insert 24 of the lower mold 20, although it contacts the preform (raw material resin) P' and the annular insert 4. With this arrangement, the glass mold 19A is prevented from being damaged. It has been proved by experiments that the glass mold 19A of this embodiment can be used under cooling conditions where it is cooled from 220° C. to 90° C. in two and a half minutes by the mold temperature regulating unit 50 under pressure of 5 tons being applied by the mold clamping unit 30.

The preform P' corresponds to a spectacle lens with positive degrees and has a profile similar to that of the finished molded product (lens L). In other words, the preform P' contacts the upper and lower mold inserts 19, 24 at a central part thereof and hence shows a double convex profile. Additionally, the volume of the preform P' is set close to a volume of the finished product. Specifically, a producing device for producing the preform P' is prepared to determine preliminary lens profiles with a plurality of molds for the preform P' or are processed into a predetermined lens-shape after molding the perform P'. The level of precision of the contour of the outer peripheral edge of the preform P' may be defined appropriately depending on the application of the finished molded product. In the case of a spectacle lens showing a meniscus profile, preforms P' having two different profiles for molding plus-power lenses having a thickness that is greater at the center than at the peripheral edge and minus-power lenses having a thickness that is smaller at the center than at the peripheral portion may be provided.

While the volume of the preform P' can be adjusted simply by adjusting the size of the mold, the volume may also be adjusted by edging in practical applications. However, when a wet method is used for edging the preform P' for the purpose of adjusting the volume and/or the profile, it is necessary to appropriately control the moisture absorption of the resin. If the preform P' has absorbed moisture to a large extent, the moisture that is discharged while the resin is being distributed under pressure may not be discharged to the outside depending on the profile of the mold and/or that of the product, which may be confined in the finished molded product can contain moisture as air bubbles. Such a phenomenon tends to be eminent when the molded lens product has a thickness that is greater at the center than at the peripheral edge thereof, especially in a spectacle lens showing a meniscus profile and having positive degrees. Therefore, it is desired to observe the state of moisture absorption of the preform P' before the preheating step and remove the moisture by means of a hot air drying process or a heater in order to eliminate moisture from the preform P'. On the other hand, since a minus-power lens is less likely to generate air bubbles as compared with positive degree lenses, the perform P' may be shaped in an outer-circumference-contact shape (e.g. planar shape) instead of the above-described shape.

The above-described second embodiment provides the following advantages in addition to those of the first embodiment.

As a result of using a glass mold 19A for the upper mold 10, the cost of producing the lens L (particularly when the lens is a spectacle lens prescribed for astigmatism) can be reduced as compared with using metal mold.

Since the preform P' for a lens with positive degrees is made to show a double convex profile to make itself contact the upper and lower mold inserts 19, 24 at a central part thereof, the resin is smoothly distributed during the pressurizing/molding process. Thus, it is possible to prevent bubbles from appearing in the resin and the molded lens product shows a highly accurate profile.

The scope of the present invention is by no means limited to the above-described embodiments, which may include modifications and improvement as long as an object of the present invention can be achieved.

For example, while the molding die 2 includes insert guide members 11, 21 and upper and lower mold inserts 14, 24 that are contained respectively in the insert guide members 11, 21 in the above embodiment, the insert guide members may be omitted. In other words, since an annular insert (elastic member) is arranged in the cavity so as to limit the distribution of the resin in the cavity according to the present invention, it is possible to prevent resin from leaking out by means of the elastic member and produce an optical component showing an excellent profile without using the insert guide members of the above-described embodiments.

While the above embodiments are described in terms of producing device and producing method for producing a spectacle lens L, an optical component according to the present invention is not limited to a spectacle lens, but an optical component according to the present invention can find applications in various optical appliances (cameras, digital cameras, video cameras, mobile phones equipped with a camera, binoculars, microscopes, optical measuring instruments, etc.) so as to be used as lens or reflector.

While the present invention is described above in terms of the best mode for carrying out the invention, the present invention is by no means limited thereto. In other words, while the present invention is described above by referring to the accompanying drawings that illustrate specific embodiments, it may be obvious to those skilled in the art that the embodiments can be modified in various different ways without departing from the spirit and scope of the invention in terms of profile, material, number and other particulars.

The profiles and the materials specifically described above are only examples given to facilitate a good understanding of the present invention and hence do not limit the scope of the present invention. Therefore, any descriptions using the denominations of the members without limiting part or all of the profiles are also found within the scope of the invention.

The priority application number JP 2003-409939 upon which this patent application is based is hereby incorporated by reference.

What is claimed is:

1. A method of producing an optical component, comprising:
providing a mold having a first optical component molding cavity thereinside and a pressurizing unit for clamping the mold to pressurize a raw material resin in the first optical component molding cavity; and applying pressure to the plasticized raw material resin and forcing it to stretch by means of the pressurizing unit,
wherein an annular elastic member is arranged in the first optical component molding cavity to define a second optical component molding cavity, the second optical component molding cavity enclosing the outer periphery of the raw material resin in a direction in which the resin is distributed to restrict the distribution of the resin and defining an external profile of the optical component.

2. The method according to claim 1, wherein the raw material resin is heated and plasticized by a heating unit provided in the mold after setting the raw material resin in position in the second optical component molding cavity.

3. The method according to claim 2, wherein the raw material resin is preheated in advance by a preheating unit before the raw material resin is set in position in the second optical component molding cavity.

4. The method according to claim 1, wherein an injection unit is used for plasticizing the raw material resin and injecting the plasticized raw material resin, and the raw material resin injected from the injection unit into the second optical component molding cavity is pressurized and distributed by the pressurizing unit.

5. The method according to claim 1, wherein the raw material resin that is pressurized and distributed by the pressurizing unit is cooled by a cooling unit provided in the mold.

6. The method according to claim 1, wherein the elastic member is provided at an inner peripheral edge thereof with annular ripples that project in the mold clamping direction and extend along the inner peripheral edge.

7. The method according to claim 1, wherein the elastic member is made of fluorocarbon rubber with hardness of not lower than 40.

8. The method according to claim 1, wherein the optical component is a lens of spectacles, and the second optical component molding cavity defined by the elastic member has an inner peripheral edge that matches the profile of a frame of the spectacles.

9. The method according to claim 1, wherein the mold includes a first mold for forming one of the optical surfaces of the optical component and a second mold opposing the first mold to form the other optical surface, and
  a rotary unit is connected to at least one of the first mold and the second mold, the rotary unit rotating the at least one of the first mold and the second mold around an optical axis of the optical component to be formed.

10. The method according to claim 1, wherein the mold includes a first mold for forming one of the optical surfaces of the optical component and a second mold opposing the first mold to form the other optical surface, and
  a molding surface of at least one of the first mold and the second mold is made of glass.

11. A device for producing an optical component, the device comprising:
  a mold having a first optical component molding cavity thereinside; and
  a pressurizing unit for clamping the mold and pressurizing the raw material resin in the first optical component molding cavity, the pressurizing unit applying pressure to the raw material resin after the resin is plasticized to distribute the resin to mold the optical component,
  wherein an annular elastic member is arranged in the first optical component molding cavity to define a second optical component molding cavity, the second optical component molding cavity enclosing the outer periphery of the raw material resin in the distributing direction of the resin to restrict the distribution of the resin and defining an external profile of the optical component.

12. The device according to claim 11, the mold comprising a heating unit for heating and plasticizing the raw material resin, wherein the raw material resin is plasticized by the heating unit after the raw material resin is set in position in the second optical component molding cavity.

13. The device according to claim 12, further comprising:
  a preheating unit for preheating the raw material resin in advance before the raw material resin is set in position in the second optical component molding cavity.

14. The device according to claim 11, further comprising:
  an injection unit for plasticizing the raw material resin and injecting the plasticized raw material resin so that the raw material resin injected from the injection unit into the second optical component molding cavity is pressurized and distributed by the pressurizing unit.

15. The device according to claim 11, wherein the mold is provided with a cooling unit for cooling the raw material resin that is pressurized and distributed by the pressurizing unit.

16. The device according to claim 11, wherein the elastic member is provided at an inner peripheral edge thereof with annular ripples that project in the mold clamping direction and extend along the inner peripheral edge.

17. The device according to claim 11, wherein the elastic member is made of fluorocarbon rubber with hardness of not lower than 40.

18. The device according to claim 11, wherein the optical component is a lens of spectacles; and
  the second optical component molding cavity defined by the elastic member has an inner peripheral edge that matches the profile of a frame of the spectacles.

19. The device according to claim 11, wherein
  the mold includes a first mold for forming one of the optical surfaces of the optical component and a second mold opposing the first mold to form the other optical surface, and
  a rotary unit is connected to at least one of the first mold and the second mold, the rotary unit rotating the at least one of the first mold and the second mold around an optical axis of the optical component to be formed.

20. The device according to claim 11, wherein
  the mold includes a first mold for forming one of the optical surfaces of the optical component and a second mold opposing the first mold to form the other optical surface, and
  a molding surface of at least one of the first mold and the second mold is made of glass.

21. The method according to claim 1, wherein the annular elastic member has an outer peripheral surface that is entirely received within the first optical component molding cavity such that the outer peripheral surface engages an inner surface of the mold.

22. The method according to claim 21, wherein the mold further comprises an upper mold insert and a lower mold insert within the first optical component molding cavity and wherein the annular elastic member has a top surface that engages a molding surface of the upper mold insert and a bottom surface that engages a molding surface of the lower mold insert.

23. The method according to claim 22, wherein the annular elastic member, the upper mold insert and the lower mold insert define the second optical component molding cavity within the first optical component molding cavity.

24. The device according to claim 11, wherein the annular elastic member has an outer peripheral surface that is entirely received within the first optical component molding cavity such that the outer peripheral surface engages an inner surface of the mold.

25. The device according to claim 24, wherein the mold further comprises an upper mold insert and a lower mold insert within the first optical component molding cavity and wherein the annular elastic member has a top surface that engages a molding surface of the upper mold insert and a bottom surface that engages a molding surface of the lower mold insert.

26. The device according to claim 25, wherein the annular elastic member, the upper mold insert and the lower mold insert define the second optical component molding cavity within the first optical component molding cavity.

* * * * *